(12) United States Patent
Taguchi et al.

(10) Patent No.: US 8,134,786 B2
(45) Date of Patent: Mar. 13, 2012

(54) METHOD AND SYSTEM FOR DETERMINING PROJECTIONS IN NON-CENTRAL CATADIOPTRIC OPTICAL SYSTEMS

(75) Inventors: Yuichi Taguchi, Cambridge, MA (US); Amit K. Agrawal, Somerville, MA (US); Srikumar Ramalingam, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 12/826,823

(22) Filed: Jun. 30, 2010

(65) Prior Publication Data

US 2012/0002304 A1    Jan. 5, 2012

(51) Int. Cl.
*G02B 17/00* (2006.01)
*G06K 9/00* (2006.01)
*G06F 7/60* (2006.01)

(52) U.S. Cl. ............. 359/726; 359/727; 382/154; 703/2

(58) Field of Classification Search .................. 359/364, 359/726, 727, 728, 729, 730, 731, 732, 733, 359/734, 735, 736; 382/154; 703/2
See application file for complete search history.

(56) References Cited

U.S. PATENT DOCUMENTS

| | | | |
|---|---|---|---|
| 7,420,750 B2 * | 9/2008 | Kuthirummal et al. | 359/726 |
| 7,916,934 B2 * | 3/2011 | Vetro et al. | 382/154 |
| 2011/0060556 A1 * | 3/2011 | Ramalingam et al. | 703/1 |
| 2011/0150319 A1 * | 6/2011 | Ramalingam | 382/153 |

OTHER PUBLICATIONS

Nuno Gonçalves and Caterina Nogueira. "Projection Through Quadric Mirrors Made Faster"; Proceedings of the 2008 IEEE 12th International Conference on Computer Vision Workshops; pp. 2141-2148 (2008).*
Amit Agrawal, Yuichi Taguchi and Srikumar Ramalingam; "Analytical Projection Model for Non-Central Catadioptric Cameras"; IEEE Computer Vision & Patter Recognition; pp. 2993-3000 (2011).*

* cited by examiner

*Primary Examiner* — David N Spector
(74) *Attorney, Agent, or Firm* — Dirk Brinkman; Gene Vinokur

(57) ABSTRACT

Embodiment of invention discloses a system and a method for determining a three-dimensional (3D) location of a folding point of a ray between a point in a scene (PS) and a center of projection (COP) of a camera of a catadioptric system. One embodiment maps the catadioptric system, including 3D locations of the PS and the COP on a two-dimensional (2D) plane defined by an axis of symmetry of a folding optical element and the PS to produce a conic and 2D locations of the PS and COP on the 2D plane, and determines a 2D location of the folding point on the 2D plane based on the conic, the 2D locations of the PS and the COP. Next, the embodiment determines the 3D location of the folding point from the 2D location of the folding point on the 2D plane.

20 Claims, 6 Drawing Sheets

METHOD AND SYSTEM FOR DETERMINING PROJECTIONS IN NON-CENTRAL CATADIOPTRIC OPTICAL SYSTEMS

FIELD OF THE INVENTION

This invention relates generally to catadioptric optical systems, and more particularly to determining a projection in non-central catadioptric optical systems.

BACKGROUND OF THE INVENTION

A catadioptric optical system combines refraction and reflection principles, usually via lenses (dioptrics) and curved mirrors (catoptrics). The catadioptric system includes camera imaging reflectors or refractors enabling wide field-of-view (FOV) imaging. The catadioptric systems have been used in a wide range of applications, including panoramic imaging and visualization, wide-angle reconstruction, surveillance, and mobile robot and car navigation. The catadioptric system can be central or non-central.

Central Catadioptric System

Central catadioptric systems use a single camera-mirror pair arranged to enable an effective single viewpoint, i.e., all rays of light forming an image acquired by the camera sensor intersect at one point. Examples of the central catadioptric systems include a perspective camera placed on one of the foci of a hyperbolic or elliptical mirror, and an orthographic camera placed on an axis of a parabolic mirror.

Non-Central Catadioptric System

Non-central catadioptric systems are widely used in computer vision applications. Examples of non-central catadioptric systems include a perspective camera placed outside of a spherical mirror, and configurations wherein the camera is not placed on the foci of a hyperbolic or elliptical mirror. In contrast with the central catadioptric systems, in the non-central catadioptric systems, the rays do not generally intersect at one point. Instead, the rays intersect along a line, or the rays are tangent to a circle, or to a more complex shape.

In a number of applications, it is important to model non-central catadioptric systems, which, in turn, requires determining a three-dimensional (3D) projection of a point in a scene (PS) to a center of projection (COP) of the camera of the catadioptric system. The non-central catadioptric system does not have an effective center of projection. The COP refers to the center of projection of the physical perspective camera used in a catadioptric system.

The 3D projection maps the three-dimensional PS to a two-dimensional (2D) pixel of an image plane of the camera of the catadioptric system.

For example, if the catadioptric system includes a reflector, such as mirror, the projection of the PS onto an image plane of the camera requires computing a path of the ray of light from that point to the COP via mirror reflection. Thus, the point of reflection on a surface of the mirror needs to be determined. Similarly, if the catadioptric system includes the refractor, e.g., a refractive sphere, two points of refraction need to be determined to model the projection.

Analytical solutions of projections for central catadioptric systems are known. However, there is no analytical solution of projection for non-central catadioptric systems.

Several conventional methods approximate non-central catadioptric systems as the central catadioptric system that enables analytical solution for projection. However, those methods lead to inaccuracies such as skewed 3D estimation.

Alternative methods use iterative non-linear optimization by initializing the point of reflection or refraction using the central approximation. However, those methods are time-consuming and inappropriate initialization leads to incorrect solutions. Yet another method uses a general linear camera representation for locally approximating a non-central catadioptric camera with an affine model that allows analytical projection, but this method also introduces approximation.

Accordingly, it is desired to provide an analytical solution of the projection for non-central catadioptric systems. It is also desired to determine analytically a three-dimensional (3D) location of at least one folding point of a ray from the PS to the COP of non-central catadioptric system.

SUMMARY OF THE INVENTION

Embodiments of invention are based on a realization that a three-dimensional (3D) projection of a point in a scene (PS) for particular configurations of a non-central catadioptric optical system can be determined analytically by mapping a 3D structure of the catadioptric system on a two-dimensional (2D) plane defined by an axis of symmetry of a folding optical element of the catadioptric system and the PS.

The folding optical element is a reflector or refractor having a quadric surface rotationally symmetric around an axis of symmetry of the surface. A center of projection (COP) of a perspective camera is placed on the axis of symmetry. The problem of determining folding, e.g., reflection/refraction points in such catadioptric cameras is solved by formulating the problem on a 2D plane defined by the axis of symmetry and the 3D scene point, and using the law of reflection/refraction as the constraints on the plane.

Some embodiments determine a reflection points on the surface of the mirror by solving a 6th degree equation for a general conic mirror. For a spherical mirror, the complexity of the equation is reduced to a 4th degree equation, resulting in a closed form solution. The analytical forward projection avoids approximations as well as iterative solution and can be used for accurate and fast 3D reconstruction via bundle adjustment. Embodiments achieve a two order of magnitude speed up over conventional methods using iterative forward projection.

Other embodiments of the invention disclose that an optical path from a given 3D point to a given viewpoint via a refractive sphere can be obtained by solving a 10th degree equation. Thus, similar to mirrors, refractive spheres can also be used for 3D reconstruction by combining the forward projection equation in a bundle adjustment.

For example, one embodiment discloses a method for determining a three-dimensional (3D) location of at least one folding point of a ray between a point in a scene (PS) and a center of projection (COP) of a camera of a catadioptric system, wherein the catadioptric system includes the camera arranged at a distance from a surface of a folding optical element, wherein the folding optical element is selected from a reflector or a refractor, wherein the folding point is on the surface and is caused by a reflection or a refraction of the ray on the surface such that the folding point partitions the ray into an incoming ray and an outgoing ray, and wherein the PS and the COP are identified by 3D locations, comprising the steps of: acquiring a configuration of the catadioptric system, wherein the catadioptric system is non central, the surface is a quadric surface rotationally symmetric around an axis of symmetry of the surface, and wherein the COP is arranged on the axis of symmetry; mapping the surface, and the 3D locations of the PS and the COP on a two-dimensional (2D) plane defined by the axis of symmetry and the PS to produce a conic and 2D locations of the PS and COP on the 2D plane, wherein the conic is a parameterization of the surface on the 2D plane;

determining a 2D location of the folding point on the 2D plane based on the conic, the 2D locations of the PS and the COP, and at least one constraint on the incoming ray and the outgoing ray; and determining the 3D location of the folding point from the 2D location of the folding point on the 2D plane, wherein the steps of the method are performed by the processor.

Another embodiment discloses a catadioptric system configured for determining a three-dimensional (3D) location of at least one folding point of a ray between a point in a scene (PS) and a center of projection (COP) of the catadioptric system, wherein the PS and the COP are identified by 3D locations, and the catadioptric system is non central, comprising: a folding optical element, wherein the folding point is caused by folding of the ray on a surface of the folding optical element, wherein the surface is a quadric surface rotationally symmetric around an axis of symmetry; a camera arranged at a distance from the surface, wherein the COP of the catadioptric system is a COP of the camera and arranged on the axis of symmetry; means for mapping the surface, and the 3D locations of the PS and the COP on a two-dimensional (2D) plane defined by the axis of symmetry and the PS to produce a conic and 2D locations of the PS and COP on the 2D plane, wherein the conic is a parameterization of the surface on the 2D plane; a processor for determining a 2D location of the folding point on the 2D plane based on the conic, the 2D locations of the PS and the COP; and means for determining the 3D location of the folding point from the 2D location of the folding point on the 2D plane.

Yet another embodiment discloses a method for determining a three-dimensional (3D) location of at least one folding point of a ray between a point in a scene (PS) and a center of projection (COP) of a catadioptric system, wherein the PS and the COP are identified by 3D locations, and the catadioptric system is non central, comprising the steps of: providing a folding optical element, wherein the folding point is caused by folding of the ray on a surface of the folding optical element, wherein the surface is a quadric surface rotationally symmetric around an axis of symmetry; providing a camera arranged at a distance from the surface, wherein the COP of the catadioptric system is a COP of the camera and arranged on the axis of symmetry; mapping the surface, and the 3D locations of the PS and the COP on a two-dimensional (2D) plane defined by the axis of symmetry and the PS to produce a conic and 2D locations of the PS and COP on the 2D plane, wherein the conic is a parameterization of the surface on the 2D plane; determining a 2D location of the folding point on the 2D plane based on the conic, the 2D locations of the PS and the COP; and determining the 3D location of the folding point from the 2D location of the folding point on the 2D plane.

DETAILED DESCRIPTION OF THE PREFERRED EMBODIMENTS

Method and System Overview

Embodiments of invention are based on a realization that a three-dimensional (3D) projection of a point in a scene (PS) for particular configurations of a non-central catadioptric optical system can be determined analytically by mapping a 3D structure of the catadioptric system on a two-dimensional (2D) plane defined by an axis of symmetry of the catadioptric system and the PS.

Such configurations include non-central catadioptric systems having a camera arranged at a distance from a surface of a reflector or a refractor, wherein the surface is quadric and rotationally symmetric around an axis of symmetry, and a center of projection (COP) of the camera used in the catadioptric system is arranged on the axis of symmetry. The 2D plane is defined by the axis of symmetry, and the PS and 2D solution of the projection represents the 3D projection, in part, due to the rotational symmetry of the catadioptric system.

Figure 1A:
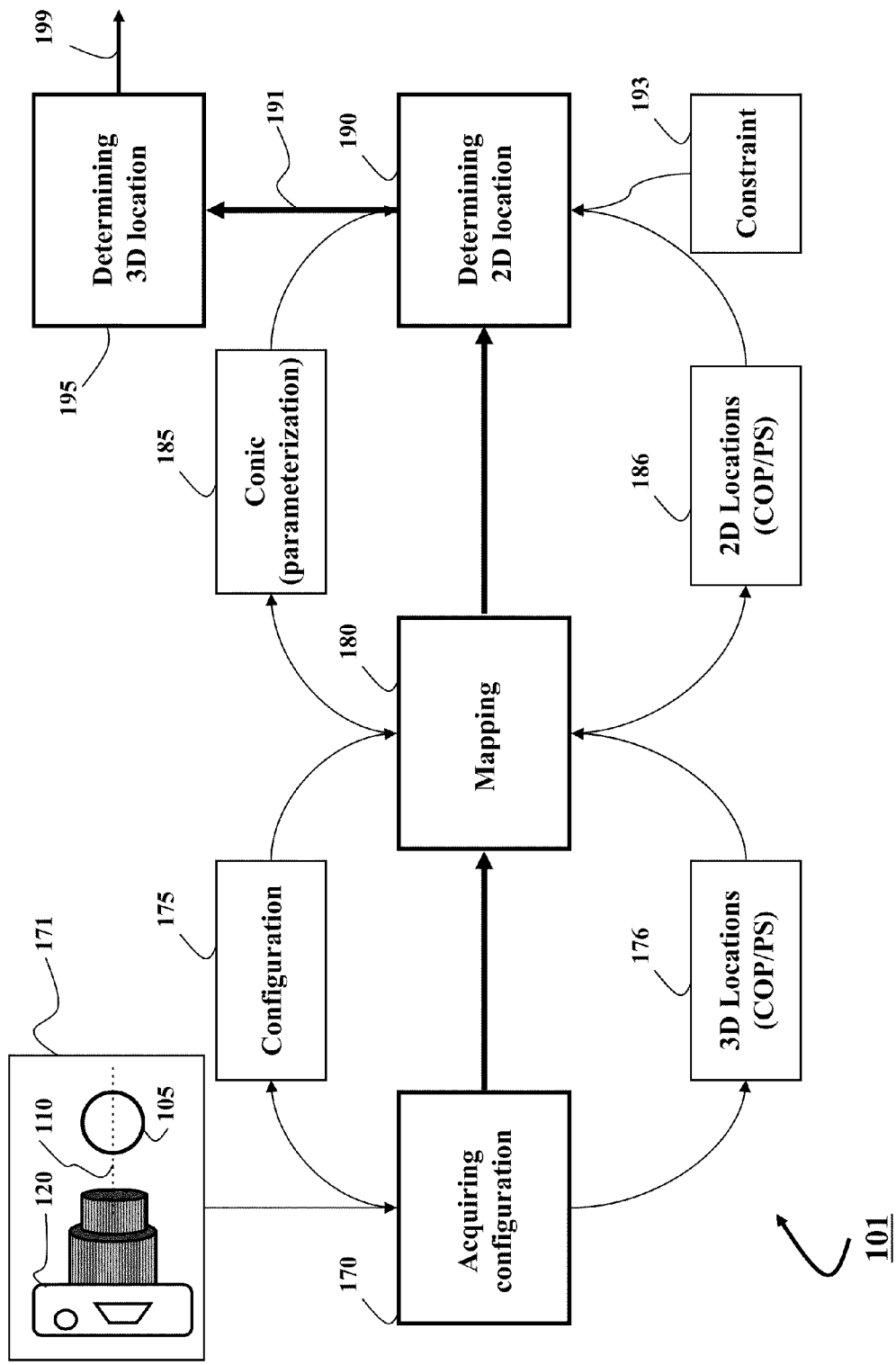
FIGS. 1A-B are a schematic and a block diagram of a method for determining a folding point on the catadioptric optical system according to embodiments of an invention.

FIG. 1A shows a block diagram of a method according embodiments of the invention. The method determines a three-dimensional (3D) location 199 of at least one folding point of a ray between a PS, e.g., the PS 130, and a COP, e.g., the COP 120, of the catadioptric system 171 having a camera, e.g., the camera 121, arranged at a distance from a surface, e.g., the surface 106 of the optical folding element, wherein the folding point is on the surface and is caused by folding of the ray on the surface such that the folding point partitions the ray into an incoming ray and an outgoing ray, and wherein the PS and the COP are identified by 3D locations 176. The steps of the method are performed by a processor 101 as known in the art.

A configuration 175 of the catadioptric system is acquired 170, wherein the catadioptric system is non central, the surface of the reflector or the refractor is a quadric surface rotationally symmetric around an axis of symmetry, e.g., the axis 110, and wherein the COP 120 is positioned on the axis of symmetry. In one embodiment, the camera is a pinhole camera. In various embodiments the configuration 175 is configuration of existing catadioptric system or a model of the catadioptric system.

According to aforementioned realization, the surface, and the 3D locations of the PS and the COP are mapped 180 on a 2D plane, e.g., the plane 140, defined by the axis of symmetry and the PS to produce the conic 105' and 2D locations 186 of the PS and COP on the 2D plane, wherein the conic is a parameterization of the surface on the 2D plane.

A 2D location 191 of the folding point on the 2D plane is determined 190 based on the conic, the 2D locations of the PS and the COP, and at least one constraint 193 on the incoming ray and the outgoing ray defined by a law of reflection or refraction. For example, in one embodiment, the catadioptric system includes the reflector, the folding point is a point of reflection of the ray from the 3D surface, and the constraint is a law of reflection. In one variation of this embodiment, the reflector is a spherical mirror, and the axis of symmetry passes through a center of the spherical mirror and the COP.

In another embodiment, the catadioptric system includes the refractor, the folding point is a point of refraction of the ray from the 3D surface, and the constraint is a law of refraction. In one variation of this embodiment, the refractor is a refractive sphere, and the axis of symmetry passes through a center of the refractive sphere and the COP.

After, the 3D location of the folding point is determined, a 2D image projection of the PS can be computed according to $$(p, q) = \left( f_x \frac{X_f}{Z_f} + c_x, f_y \frac{Y_f}{Z_f} + c_y \right),$$

wherein (p, q) are coordinates of the 2D image projection, $(X_f, Y_f, Z_f)$ are coordinates of the folding point, $(f_x, f_y)$ are effective focal lengths of the camera in x and); directions, and $(c_x, c_y)$ is a 2D principal point of the camera.

Forward Projection for Quadric Mirrors

Figure 1B:
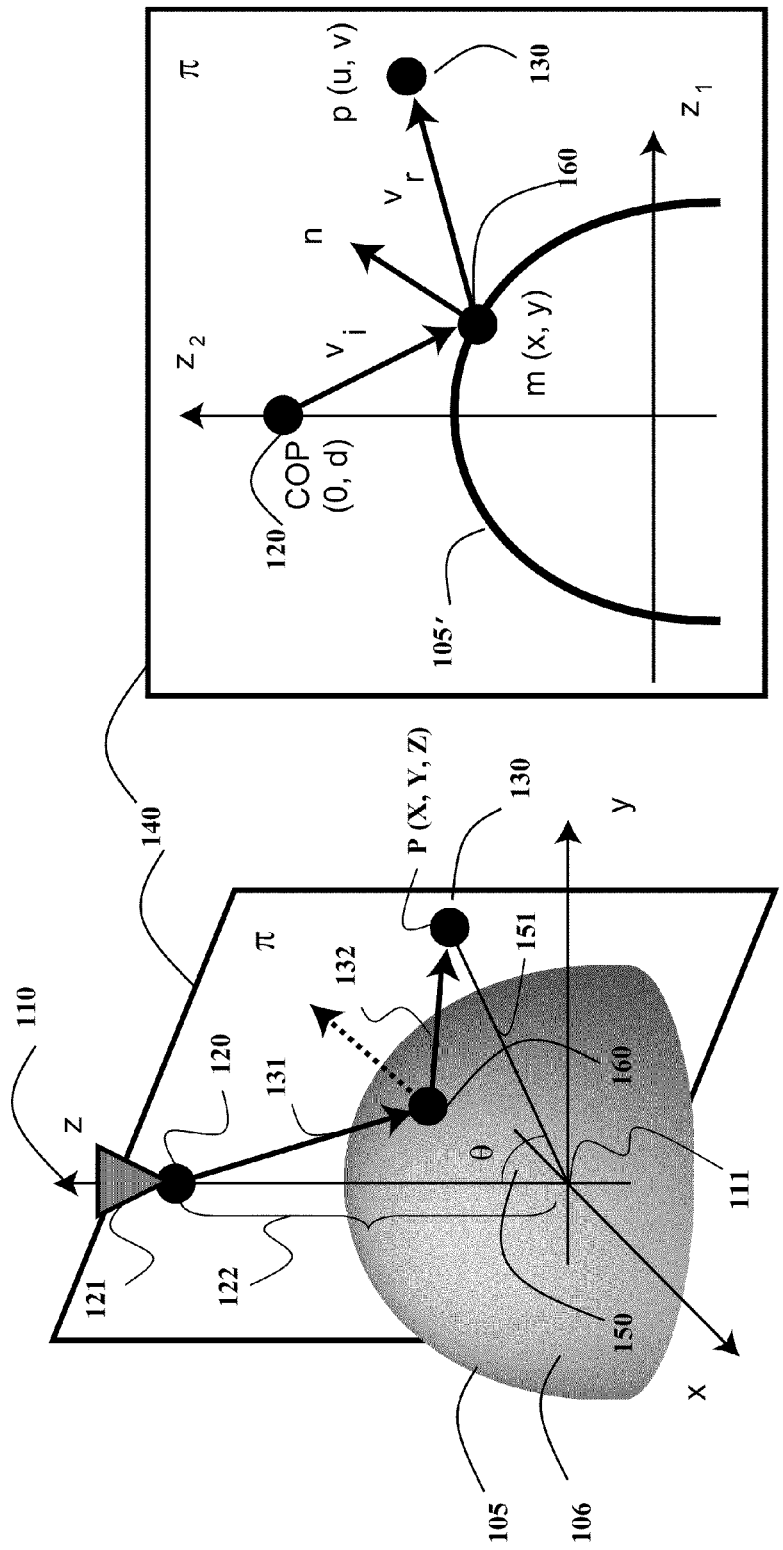

FIG. 1B shows an example of the catadioptric system according to one embodiment of the invention. The catadioptric system is non-central and includes a camera 121, e.g., a perspective camera, arranged at the distance from the surface 106 of a folding optical element 105 selected from a reflector or a refractor. The camera is configured to image the surface. In this embodiment, catadioptric system includes the reflector, i.e., a mirror. Other embodiments include a refractor in place of the reflector, such that the catadioptric system includes at least one of the reflector and the refractor. The surface 106 is quadric and rotationally symmetric around an axis of symmetry 110, and the COP 120 is arranged on the axis of symmetry.

The embodiments of the invention determine a 3D location of at least one folding point 160 of a ray connecting a point in a scene (PS) 130 and the COP 120 of the catadioptric system. The folding point of the ray is on the surface 106. The folding point is caused by a reflection or a refraction of the ray on the surface such that the folding point partitions the ray into an incoming ray 131 and an outgoing ray 132.

For the purpose of this description, the z axis of the 3D coordinate system is the axis of symmetry, e.g., the axis of the mirror. The camera 121 can be a pinhole camera placed at a distance d 122 from an origin 111 on the mirror axis, and $P=[X, Y, Z]^T$ is the PS, wherein X, Y, Z are coordinates of a 3D location of the PS in the 3D coordinate system. Because the mirror is rotationally symmetric, the mirror reflection of the PS is analyzed in a two-dimensional (2D) plane π 140 defined by the axis of symmetry and the PS.

Let $(z_1, z_2)$ be axes determining a local coordinate system of the 2D plane π. In this plane, a 2D location of the PS P is P=[u,v], wherein u is a first coordinate of the 2D location of the PS, u=S sin θ, and v is a second coordinate of the 2D location of the PS, v=Z, wherein Z is a coordinate for the axis corresponding to the axis of the symmetry, and where $S=\sqrt{X^2+Y^2+Z^2}$ is a distance from the PS to the origin 111 and an angle $\theta = \cos^{-1}(Z/S)$ is the angle 150 between the mirror axis and a line 151 from the origin to the PS.

In the plane π, the surface is parameterized on the 2D plane as a conic section 105', herein after "conic" described by a function $Az_2^2+z_1^2+Bz_2=C$, wherein A, B, C are parameters of the function that depend on a type of the quadric surface, as described in more details below. If the folding point m has a 2D location $m=[x,y]^T$, then $x=\pm\sqrt{C-By-Ay^2}$. A vector $v_i$ of the incoming ray is $v_i=[x,y-d]^T$, and a normal vector n at the folding point m is $n=[x, B/2+Ay]^T$. Using the law of reflection, a vector of the outgoing or reflected ray is $v_r=v_i-2n(n^Tv_i)/(n^Tn)$.

Because the outgoing ray passes through the point P, a function of y is $f(y)=v_r \times (p-m)=0$, where × denotes a cross product. In one embodiment, a numerator of the function f(y) is factorized as $uK_1(y)+K_2(y)\sqrt{C-By-Ay^2}$,
where $K_1(y)$ and $K_2(y)$ are reflection polynomials in y, defined as $$K_1(y)=K_{11}y^3+K_{12}y^2+K_{13}y+K_{14}, K_2(y)=K_{21}y^2+K_{22}y+K_{23} \quad (1)$$

and individual terms are given by $K_{11}=4A(1-A), K_{12}=4B-4A(d+Ad+2B)$ $K_{13}=8AC-4Bd-3B^2-4C-4ABd, K_{14}=-dB^2+4CB+4Cd,$ $K_{21}=4(A-1)(A(d+v)+B), K_{22}=8C+2B^2+4A(-2C+B(d+v)+2dv),$ and $K_{23}=B^2(d+v)+4B(-C+dv)-4C(v+d).$ Because the function f(y)=0, the square root term in Equation (1) are removed as $$uK_1(y)=-K_2(y)\sqrt{C-By-Ay^2} \Rightarrow u^2K_1^2(y)=K_2^2(y)(C-By-Ay^2).$$

Accordingly, the embodiments of the invention define and use a $6^{th}$ order forward projection (FP) equation in terms of the coordinate y $$u^2K_1^2(y)+K_2^2(y)(Ay^2+By-C)=0. \quad (2)$$

where u is the first element of the 2D coordinate of the PS, $K_1(y)$ and $K_2(y)$ are polynomials in y defined in Equation (1), and A, B, C are parameters for the conic equation.

For a given point P, solving Equation (2) results in six solutions for the coordinate y. The final solution is determined by checking a constraint on the incoming ray and the outgoing ray, e.g., the law of reflection and/or refraction, for each solution. For example, in embodiment that includes a mirror as shown in FIG. 1A, the final solution considers a constraint of a law of reflection, i.e., $v_r^T n=-v_i^T n,$ wherein $v_i$ is a vector representing the incoming ray, $v_r$ is a vector representing the outgoing ray, T is a transpose operator, n is a vector representing a normal of the surface at the folding point Accordingly, the embodiments determine the 2D location of the folding point on the 2D plane based on the conic, the 2D locations of the PS and the COP, and at least one constraint on the incoming ray and the outgoing ray, and than determines the 3D location of the folding point from the 2D location of the folding point on the 2D plane.

For example, in the embodiment shown in FIG. 1B, the 3D location of the folding point is determined according to $xz_1/\|z_1\|+yz_2/\|z_2\|$, wherein $X=sign(u)\sqrt{C-By-Ay^2}.$ Various embodiments of the invention use the $6^{th}$ order FP equation described above to determine the 2D location of the folding point. However, for some types of the conics, the FP equation is simplified, as described below. The 3D location of the folding point is determined from the 2D location of the folding point on the 2D plane.

Forward Projection for Spherical Mirror

In one embodiment, the catadioptric system includes the spherical mirror, which allows for reducing the degree of the FP equation. Substituting the parameters A=1, B=0, C=$r^2$ in the FP equation, where r is a radius of the spherical mirror and d is a distance between the COP and a center of the sphere, results in a $4^{th}$ order forward projection equation $$u^2(r^2(d+y)-2dy^2)^2-(r^2-y^2)(r^2(d+v)-2dvy)^2=0. \quad (3)$$

Because the FP equation is of $4^{th}$ order, one embodiment determines a close form solution for the coordinate y in terms of radicals. Also, in this embodiment, the location of COP is not restricted. For any COP, e.g., a pinhole location, a new axis from the pinhole to a center of the spherical mirror is defined.

Degree of FP Equation for Several Quadric Reflectors

Table 1 shows the degree of FP equation for spherical (A=1, B=0, C>0), elliptical (B=0), hyperbolic (A<0, C<0) and parabolic (A=0, C=0) mirrors of non-central catadioptric system.

TABLE 1

Degree of FP equation for non-central catadioptric systems

| Mirror Shape | Pinhole Placement | Parameters | Degree |
|---|---|---|---|
| General | On axis | A, B, C | 6 |
| Sphere | Any | A = 1, B = 0, C > 0 | 4 |
| Elliptic | On axis, Not at Foci | B = 0 | 6 |
| Hyperbolic | On axis, Not at Foci | A < 0, C < 0 | 6 |
| Parabolic | On axis, Finite $d^d$ | A = 0, C = 0 | 5 |

Forward Projection for Refractive Sphere

Figure 2:
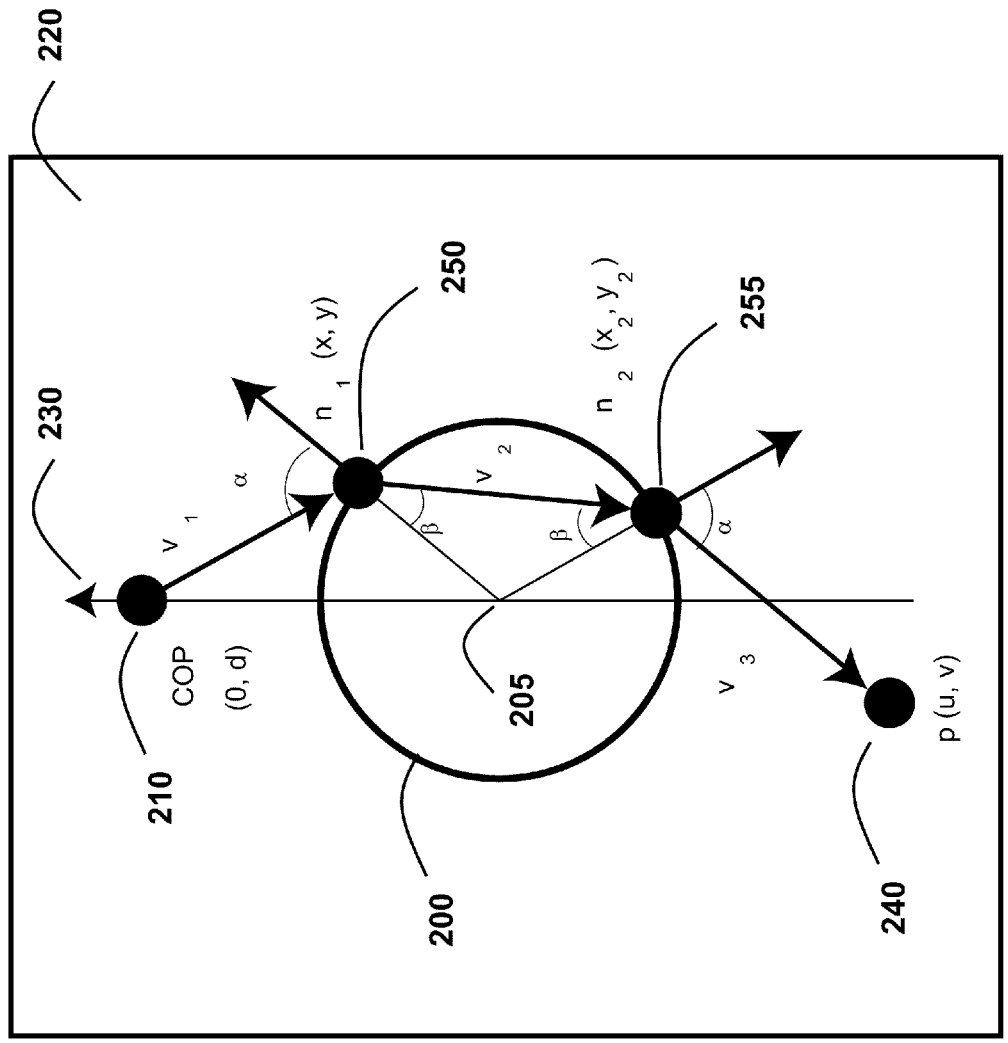
FIG. 2 is a schematic of a method for determining refraction points in a system including a refractive sphere according to the embodiments of the invention.

FIG. 2 shows a schematic of defining and using the forward projection equation for imaging via a refractive sphere according to another embodiment of the invention. This embodiment uses the catadioptric systems that includes a refractive sphere 200 of radius r and a refractive index $\mu$. For example, the refractive sphere of radius r is arranged at an origin 205 of a coordinate system, and a pinhole camera 210 is arranged at distance d from the origin. As described above the embodiments analyze the projection on a 2D plane 220 defined by the axis of symmetry 230 and the PS p 240.

Points $n_1=[x,y]^T$ and $n_2=[x_2,y_2]^T$ are the folding points of the ray, i.e., a first refraction point 250 on the sphere has coordinates x, y and a second refraction point 255 on the sphere has coordinates $x_2$, $y_2$, and vectors $v_1$, $v_2$, and $v_3$ are vectors representing light path from the COP to the first refraction point, from the first refraction point to the second refraction point, and from the second refraction point to the PS, respectively.

Then $v_1=[x,y-d]^T$ and $n_1^T n_1 = n_2^T n_2 = r^2$.

Based on the incoming ray $v_i$ and a normal n at the surface separating mediums of refractive indexes $\mu_1$ and $\mu_2$, the refracted ray $v_r$ is written in vector form according to $$v_r = av_i + bn, \text{ where}$$

$$a = \frac{\mu_1}{\mu_2}, b = \frac{-\mu_1 v_i^T n \pm \sqrt{\mu_1^2(v_i^T n)^2 - (\mu_1^2 - \mu_2^2)(v_i^T v_i)(n^T n)}}{\mu_2(n^T n)}. \quad (15)$$

Thus, $$v_r^T n \propto \pm \sqrt{\mu_1^2(v_i^T n)^2 - (\mu_1^2 - \mu_2^2)(v_i^T v_i)(n^T n)},$$

wherein the sign is determined using another constraint, i.e., signs vectors of $v_r^T n$ and $v_i^T n$ are the same.

Because a tangent ray from the pinhole to the sphere is at $y=r^2/d$, $y \geq r^2/d$ for a valid refraction point. Thus, $v_1^T n_1 = r^2 - dy \leq 0$, and $$v_2 = \frac{1}{\mu} v_1 + \frac{-v_1^T n_1 - \sqrt{(v_1^T n_1)^2 - r^2(1-\mu^2)(v_1^T v_1)}}{\mu r^2} n_1. \quad (16)$$

The second refraction point $n_2$ equals $n_1 + \lambda v_2$ for a constant $\lambda$, which is determined according to $$r^2 = n_2^T n_2 = r^2 + \lambda^2 v_2^T v_2 + 2\lambda v_2^T n_1, \Rightarrow \lambda = -2v_2^T n_1/v_2^T v_2, \quad (17)$$

where $$v_2^T n_1 = -\sqrt{(dy-r^2)^2 + r^2(\mu^2-1)(d^2-2dy+r^2)}/\mu$$

$$v_2^T v_2 = d^2 - 2dy + r^2.$$

The outgoing refracted ray is $v_3 = \mu v_2 + b_3 n_2$, for some $b_3$. Due to symmetry of the sphere $v_3^T n_2 = -v_1^T n_1$ and $v_2^T n_2 = -v_2^T n_1$. Accordingly, $b_3 = (-v_1^T n_1 - \mu v_2^T n_1)/r^2$.

Because, the outgoing refracted ray $v_3$ passes through the PS $p=[u,v]^T$, $v_3 \times (p-n_2)=0$. By substituting all the terms, we obtain the following equation $$0 = v_3 \times (p-n_2) \Rightarrow 0 = K_1(x,y) + K_2(x,y)\sqrt{A} + K_3(x,y)A^{3/2}, \quad (18)$$

where $A = d^2\mu^2 r^2 - d^2 x^2 - 2d\mu^2 r^2 y + \mu^2 r^4$, and $K_1$, $K_2$ and $K_3$ are refractive polynomials in x and y:

$K_1 = d^3 \mu^2 x^5 + ud^3 \mu^2 x^4 + 2d^3 \mu^2 x^3 y^2 + 2vd^3 \mu^2 x^3 y + d^3$
$\mu^2 xy^4 2vd^3 \mu^2 xy^3 - ud^3 \mu^2 y^4 - 2ud^3 x^4 - 4vd^3 x^3 y +$
$2ud^3 x^2 y^2 - 2d^2 \mu^2 x^5 - vd^2 \mu^2 x^5 - ud^2 \mu^2 x^4 y - 4d^2$
$\mu^2 x^3 y^3 - 6vd^2 \mu^2 x^3 y^2 + 2ud^2 \mu^2 x^2 y^3 - 2d^2 \mu^2 xy^5 - 5vd^2$
$\mu^2 xy^4 + 3ud^2 \mu^2 y^5 + 2vd^2 x^5 - 2ud^2 x^4 y + 2vd^2 x^3 y^2 -$
$2ud^2 x^2 y^3 + d \mu^2 x^7 + ud \mu^2 x^6 + 3d \mu^2 x^5 y^2 + 4vd \mu^2 x^5 y -$
$2ud^2 x^4 y + 2vd^2 x^3 y^2 - 2ud^2 x^2 y^3 + d \mu^2 x^7 + ud \mu^2 x^6 + 3d$
$\mu^2 x^5 y^2 + 4vd \mu^2 x^5 y - 3ud \mu^2 y^6 - v \mu^2 x^7 + u \mu^2 x^6 y - 3v$
$\mu^2 x^5 y^2 + 3u \mu^2 x^4 y^3 - 3v \mu^2 x^3 y^4 + 3u \mu^2 x^2 y^5 - v$
$\mu^2 xy^6 + u \mu^2 y^7$ $K_2 = 2vd^2 \mu^2 x^3 - 2ud^2 \mu^2 x^2 y + 2vd^2 \mu^2 xy^2 - 2ud^2 \mu^2 y^3 -$
$2ud^2 x^2 y - 2vd^2 xy^2 - 4vd \mu^2 x^3 y - 4ud \mu^2 x^2 y^2 - 4vd$
$\mu^2 xy^3 + 4ud \mu^2 y^4 + 2udx^4 + 2vdx^3 y + 2udx^2 y^2 +$
$2vdxy^3 + 2v \mu^2 x^5 - 2u \mu^2 x^4 y + 4v \mu^2 x^3 y^2 - 4u \mu^2 x^2 y^3 + 2v$
$\mu^2 xy^4 - 2u \mu^2 y^5$ $K_3 = 2uy - 2vx.$ In one embodiment, the square root terms in Equation (18) are removed as $$0 = K_2^2(x,y)A + K_3^2(x,y)A^3 + 2K_2(x,y)K_3(x,y)A^2 - K_1^2(x,y), \quad (19)$$

which after simplification is a $8^{th}$ degree polynomial equation in both x and y. Bringing the odd powered terms of x on one side, squaring and substituting $x^2 = r^2 - y^2$ result, after simplification, in a $10^{th}$ degree equation in y.

Obtained Light Path for Refractive Sphere

Figure 3C:
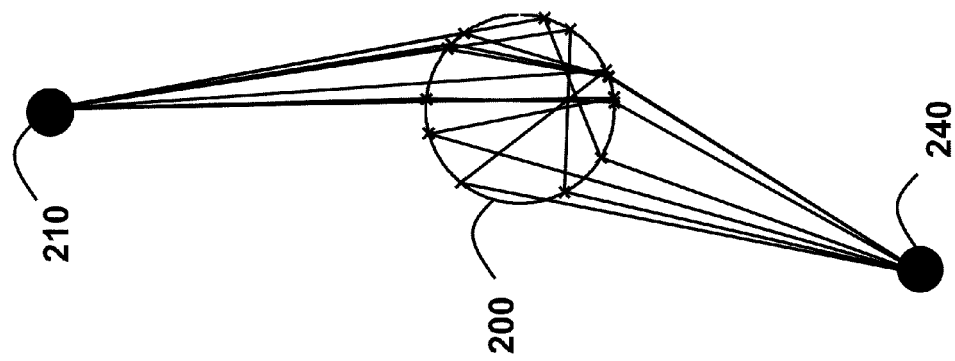
FIGS. 3A-3C are schematics of light path obtained by solving a forward projection for a refractive sphere according to the embodiments of the invention.
Figure 3B:
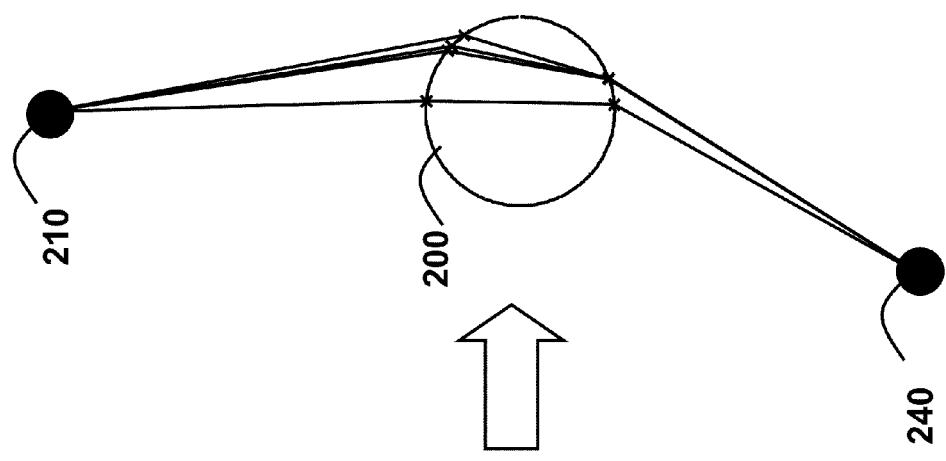
Figure 3A:
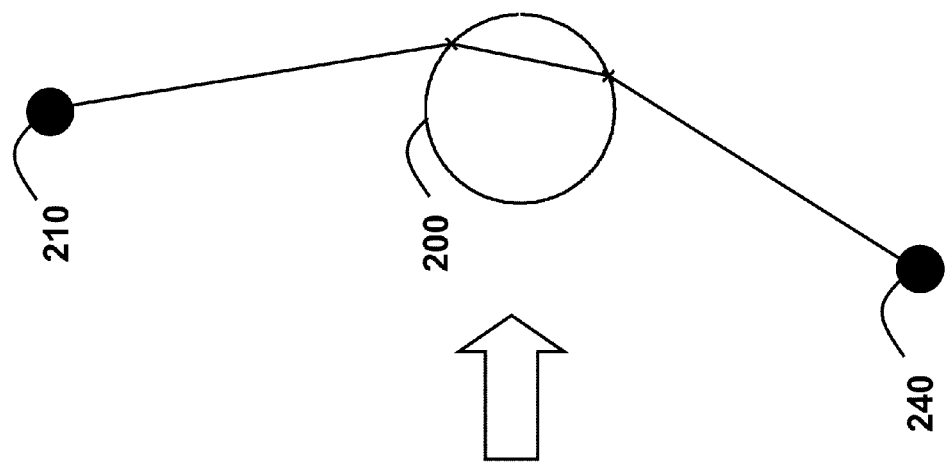

FIGS. 3A-3C show an example of solving the FP equation and determining the folding points for the refractive sphere according several embodiments of the invention. For a given PS p 240, solving Equation (19) results in ten solutions for y. In general, when the PS is not on the axis of symmetry, only eight out of the ten solutions are real, from which the corresponding light paths are obtained as shown in FIG. 3A. A constraint $y \geq r^2/d$ further reduces the possible solutions to four solutions shown in FIG. 3B. The final solution shown in FIG. 3C is found using another constraint, i.e., by testing the law of refraction for each possible solution.

Sparse 3D Reconstruction Using Spherical Mirrors

An analytical forward projection (AFP) is used for sparse 3D reconstruction, i.e., determining concurrently 3D points in the scene and parameters of the catadioptric system, using bundle adjustment algorithm. In one embodiment, the catadioptric system includes a single perspective camera imaging multiple spherical mirrors. One example of such mirrors is a stainless steel ball. The internal camera calibration is done separately off-line, radius is known. The 3D locations of centers of the mirrors are determined as described below.

Bundle Adjustment Using Analytical Forward Projection

Let $C(i)=[C_x(i), C_y(i), C_z(i)]^T$, $i=1 \ldots M$ be the sphere centers, and $P(j)=[P_x(j), P_y(j), P_z(j)]^T$, $j=1 \ldots N$ be the 3D PS in the camera coordinate system when the pinhole camera is arranged at the origin. We rewrite the FP Equation (3) in terms of 3D quantities. For a given 3D point P(j) and a mirror center C(i), the orthogonal vectors $z_1$ and $z_2$ defining the 2D plane $\pi$ are given by $$z_2 = -C(i) \text{ and } z_1 = P(j) - C(i)\frac{C(i)^T P(j)}{\|C(i)\|^2}.$$

Further, $$d = \|z_2\|, u = \|z_1\|, v = -C(i)^T(P(j)-C(i))/\|C(i)\|. \tag{20}$$

By substituting d, v and u in (3), the FP equation is rewritten as $$c_1 y^4 + c_2 y^3 + c_3 y^2 + c_4 y + c_5 = 0, \tag{21}$$

where each coefficient $c_i$ is a function of P(j) and C(i) only. In general, when the scene point is outside the sphere and is visible through mirror reflection, there are four possible solutions. The single correct solution is determined by checking the law of reflection for each possible solution.

Using the solution, the 3D reflection point on the sphere is determined according to $$R_m(i, j) = \tag{22}$$
$$[X_m(i,j), Y_m(i,j), Z_m(i,j)]^T = C(i) + \sqrt{r^2 - y^2}\frac{z_1}{\|z_1\|} + y\frac{z_2}{\|z_2\|}.$$

Finally, the 2D image projection pixel is determined according to $$p(i, j) = \frac{f_x X_m(i,j)}{Z_m(i,j)} + c_x, \quad q(i, j) = \frac{f_y Y_m(i,j)}{Z_m(i,j)} + c_y,$$

where $(f_x, f_y)$ and $(c_x, c_y)$ are a focal length and a principal point of the camera, respectively.

Let $[\hat{p}(i,j), \hat{q}(i,j)]^T$ be the image projection of the $j^{th}$ 3D point for the $i^{th}$ sphere and $[p(i,j), q(i,j)]^T$ are current estimates determined from current estimates of sphere centers and 3D scene points. Each pair (i,j) gives a 2-vector error function $$F(i,j)=[p(i,j)-\hat{p}(i,j), q(i,j)-\hat{q}(i,j)]^T, \tag{23}$$

and an average reprojection error is $$E = \frac{1}{NM}\sum_{j=1}^{M}\sum_{i=1}^{N} \|F(i,j)\|^2.$$

The bundle adjustment is preformed by minimizing the error E starting from an initial solution. The initial 3D points are obtained as the center of the shortest transversal of the respective back-projection rays. The initial sphere centers are obtained using the acquired images.

Jacobian Computation

Another embodiment uses AFP to analytically determine a Jacobian matrix of a reprojection error, which accelerates the bundle adjustment process. Let t denote an unknown. Then $$\frac{\partial F(i, j)}{\partial t} = \begin{bmatrix} \frac{\partial p(i, j)}{\partial t} \\ \frac{\partial q(i, j)}{\partial t} \end{bmatrix} = \tag{24}$$

$$\begin{bmatrix} f_x\left(\frac{1}{Z_m(i,j)}\frac{\partial X_m(i,j)}{\partial t} - \frac{X_m(i,j)}{Z_m(i,j)^2}\frac{\partial Z_m(i,j)}{\partial t}\right) \\ f_y\left(\frac{1}{Z_m(i,j)}\frac{\partial Y_m(i,j)}{\partial t} - \frac{Y_m(i,j)}{Z_m(i,j)^2}\frac{\partial Z_m(i,j)}{\partial t}\right) \end{bmatrix}.$$

Because $X_m, Y_m, Z_m$ depends on the coordinate y, the above derivatives depend on $$\frac{\partial y}{\partial t}.$$

Usually, a closed form expression for the coordinate y is required to determine $$\frac{\partial y}{\partial t}.$$

However, one embodiment of the invention uses alternative approach, which takes the derivative of the FP Equation (10), and obtains $$\frac{\partial y}{\partial t} = -\frac{y^4\frac{\partial c_1}{\partial t} + y^3\frac{\partial c_2}{\partial t} + y^2\frac{\partial c_3}{\partial t} + y\frac{\partial c_4}{\partial t} + \frac{\partial c_5}{\partial t}}{4c_1 y^3 + 3c_2 y^2 + 2c_3 y + c_4}. \tag{25}$$

For a given 3D point P(j) and sphere center C(i), y is computed by solving the FP equation, which can be substituted in Equation (14) to determine $$\frac{\partial y}{\partial t}.$$

The gradient of the reprojection error, with respect to each unknown, is determined using Equations (11), (13), and (14).

3D Reconstruction with Outlier Removal

Some embodiments consider that corresponding image points are estimated using a feature matching algorithm, such as a scale-invariant feature transform (SIFT), and invariably contain outliers and false matches. Those embodiments perform reconstruction by iterating bundle-adjustment with outlier removal. After each bundle-adjustment step, the 3D points whose reprojection error is greater than twice the average reprojection error are removed. Because AFP significantly reduces bundle-adjustment time, one embodiment is repeats such removal multiple times and is effective in handling outliers. Thus, analytical FP allows complex non-central models to be used for outlier removal without a central approximation.

Setup and Initial Estimate of Sphere Centers

One embodiment uses, e.g., four spherical mirrors of radius 0.75" positioned with an interval of 3", and acquires a single image using a Mamiya 645AFD camera. Each sphere image in the photo image has 1300×1300 resolution. To determine initial sphere centers, the embodiment marks several points on each sphere boundary, corresponding to the rays tangential to the sphere, and determines a central ray that makes the same angle α with all the tangential rays. The sphere center is at a distance of r/sin α along the central ray.

Iterative Forward Projection vs. Analytical Forward Projection

Conventional iterative forward projection (IFP) first computes the initial image projection of a 3D point using the central approximation, and then performs non-linear optimization to minimize the distance between the 3D point and the back-projected ray. For projecting $10^5$ 3D points with a single sphere, IFP takes 1120 seconds, while AFP takes only 13.8 seconds, i.e., ~80 times faster. AFP, along with analytical Jacobian computation, achieves two orders of magnitude faster when compared to IFP for 3D reconstruction using bundle adjustment.

Back-Projection for Spherical Mirror

Figure 4:
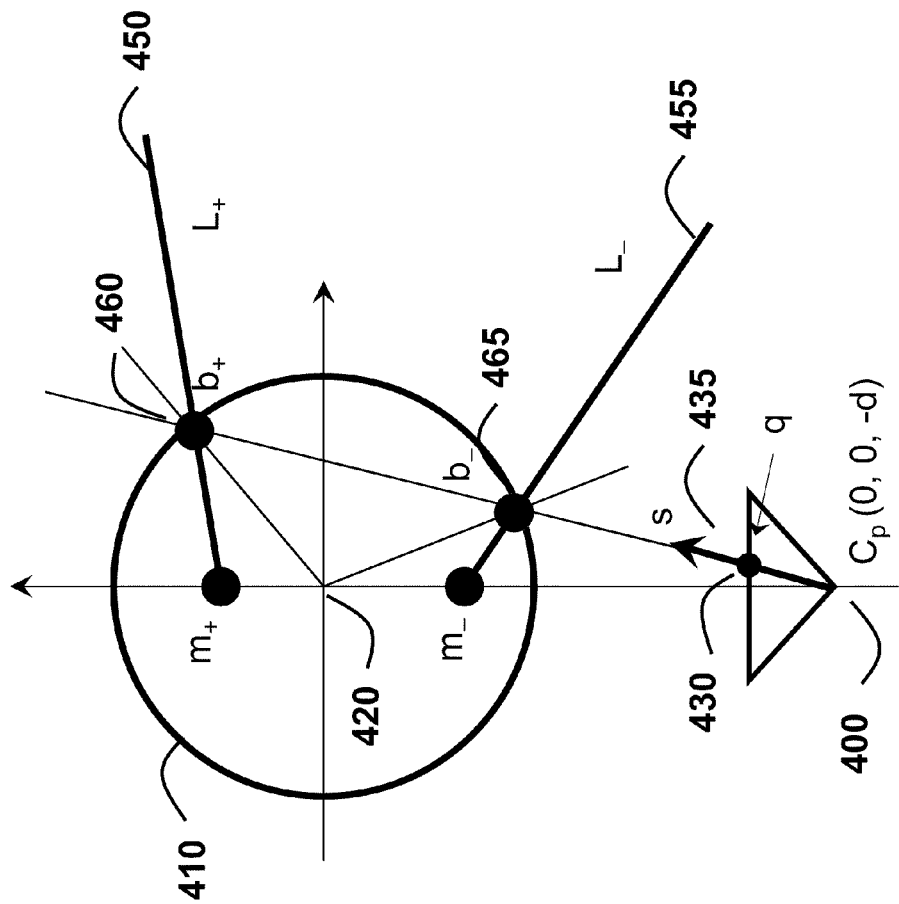
FIG. 4 is a schematic of back projection for spherical mirror according to the embodiments of the invention.

FIG. 4 shows a schematic of back projection for spherical mirror according one embodiment of the invention. The embodiment rewrites the back-projection equations in matrix-vector form. For example, a point $C_p=[0,0,-d]^T$ is the COP 400 and a spherical mirror 410 of radius r is located at the origin 420. For an image point q 430, $s=K^{-1}q$ is a direction 435 of the ray, where $K_{3\times 3}$ is the internal camera calibration matrix. The intersection points b with the mirror is $$b = C_p + s\frac{ds_3 \pm \sqrt{d^2 s_3^2 - (d^2 - r^2)(s^T s)}}{s^T s}, \quad (26)$$

where $S_3$ is the third element of s, $b^T b = r^2$ and the normal at b is b/r.

Because $v_i = b - C_p$, the outgoing vector $v_r$ is $$v_r = (b - C_p) - 2b(b^T(b-C_p))/r^2 = -b - C_p + 2b(b^T C_p)/r^2, \quad (27)$$

which intersects the mirror axis at $m=[0,0,k]^T$, where $k = dr^2/(2db_3 + r^2)$. Thus, the Plücker coordinates of the reflected 3D ray are $L = (b^T - m^T, (b \times m)^T)^T$. We use $L_+$ 450 and $L_-$ 455 to represent the reflected rays corresponding to the two intersections of $v_i$ with the sphere ($b_+$ 460 and $b_-$ 465). We represent the two lines with a second-order line complex C, described as a symmetric 6×6 matrix $$C \sim W(L_+^T L_- + L_-^T L_+)W, \quad W = \begin{pmatrix} 0 & I \\ I & 0 \end{pmatrix}, \quad (28)$$

where ~ denotes the equality of matrices up to a scale factor. By substituting b and M, we obtain a line complex C that includes quartic monomials of s. Let $v_{sym}(C)$ be the column-wise vectorization of the upper-right triangular part of C (21-vector) and $\hat{\hat{s}}$ denote double lifted coordinates of s in the lexicographic order (15-vector):

$$\hat{\hat{s}} = \begin{bmatrix} s_1^4 \\ s_1^3 s_2 \\ s_1^3 s_3 \\ s_1^2 s_2^2 \\ s_1^2 s_2 s_3 \\ s_1^2 s_3^2 \\ s_1 s_2^3 \\ s_1 s_2^2 s_3 \\ s_1 s_2 s_3^2 \\ s_1 s_3^3 \\ s_2^4 \\ s_2^3 s_3 \\ s_2^2 s_3^2 \\ s_2 s_3^3 \\ s_3^4 \end{bmatrix}$$

Then, we obtain the back-projection equation in a matrix-vector form:

$$v_{sym}(C) \sim B_{r,d}\hat{\hat{s}} = B_{r,d}\hat{K}^{-1}[/\$]\$^{\hat{}}\$\$[/\$]\$^{\hat{}}A\hat{x}\hat{q}, \quad (29)$$

where $B_{r,d}$ is a sparse 21×15 matrix depending only on r and d:

$$B_{r,d} = \begin{pmatrix}
0 & 0 & 0 & A & 0 & 0 & 0 & 0 & 0 & 0 & A & 0 & A & 0 & 0 \\
0 & -A & 0 & 0 & 0 & 0 & -A & 0 & -A & 0 & 0 & 0 & 0 & 0 & 0 \\
A & 0 & 0 & A & 0 & A & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 \\
0 & B & 0 & 0 & 0 & 0 & B & 0 & C & 0 & 0 & 0 & 0 & 0 & 0 \\
-B & 0 & 0 & -B & 0 & -C & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 \\
D & 0 & 0 & D & 0 & E & 0 & 0 & 0 & 0 & 0 & 0 & 0 & 0 & 0 \\
0 & 0 & 0 & B & 0 & 0 & 0 & 0 & 0 & B & 0 & C & 0 & 0 & 0 \\
0 & -B & 0 & 0 & 0 & 0 & -B & 0 & -C & 0 & 0 & 0 & 0 & 0 & 0 \\
0 & 0 & 0 & 0 & 0 & 0 & 0 & 0 & 0 & 0 & 0 & 0 & 0 & 0 & 0 \\
0 & D & 0 & 0 & 0 & 0 & D & 0 & E & 0 & 0 & 0 & 0 & 0 & 0 \\
0 & 0 & 0 & D & 0 & 0 & 0 & 0 & 0 & D & 0 & E & 0 & 0 & 0 \\
0 & 0 & 0 & 0 & B & 0 & 0 & 0 & 0 & 0 & B & 0 & C & 0 & 0 \\
0 & 0 & -B & 0 & 0 & 0 & 0 & -B & 0 & -C & 0 & 0 & 0 & 0 & 0 \\
0 & 0 & 0 & 0 & 0 & 0 & 0 & 0 & 0 & 0 & 0 & 0 & 0 & 0 & 0 \\
0 & 0 & F & 0 & 0 & 0 & F & 0 & F & 0 & 0 & 0 & 0 & 0 & 0 \\
0 & 0 & 0 & 0 & F & 0 & 0 & 0 & 0 & 0 & F & 0 & F & 0 & 0 \\
G & 0 & 0 & H & 0 & E & 0 & 0 & 0 & 0 & G & 0 & E & 0 & F \\
\end{pmatrix}$$

$$\begin{cases} A = r^4 d^2(d^2 - r^2) \\ B = r^2 d(d^2 - r^2)(r^2 - 2d^2) \\ C = r^4 d(d^2 - r^2) \\ D = (d^2 - r^2)(r^2 - 2d^2)^2 \\ E = r^2(d^2 - r^2)(r^2 - 4d^2) \\ F = r^4(d^2 - r^2) \\ G = 4d^2(d^2 - r^2)^2 \\ H = 2G \end{cases}$$

Epipolar Curve for Spherical Mirror

One embodiment considers a 3D ray defined in the sphere-centered coordinate system and represented with Plücker coordinates as $L_0$. This ray intersects a line complex C if and only if $$L_0^T C L_0 = 0. \quad (30)$$

Because the line complex C includes quartic monomials of S, the constraint results in a $4^{th}$ order curve. The projection of $L_0$, therefore, appears as a quartic curve in the image of spherical minor, which means that spherical-minor based catadioptric systems yield fourth order epipolar curves.

The embodiment uses the FP equation to validate degree and shape of the epipolar curves.

Figure 5:
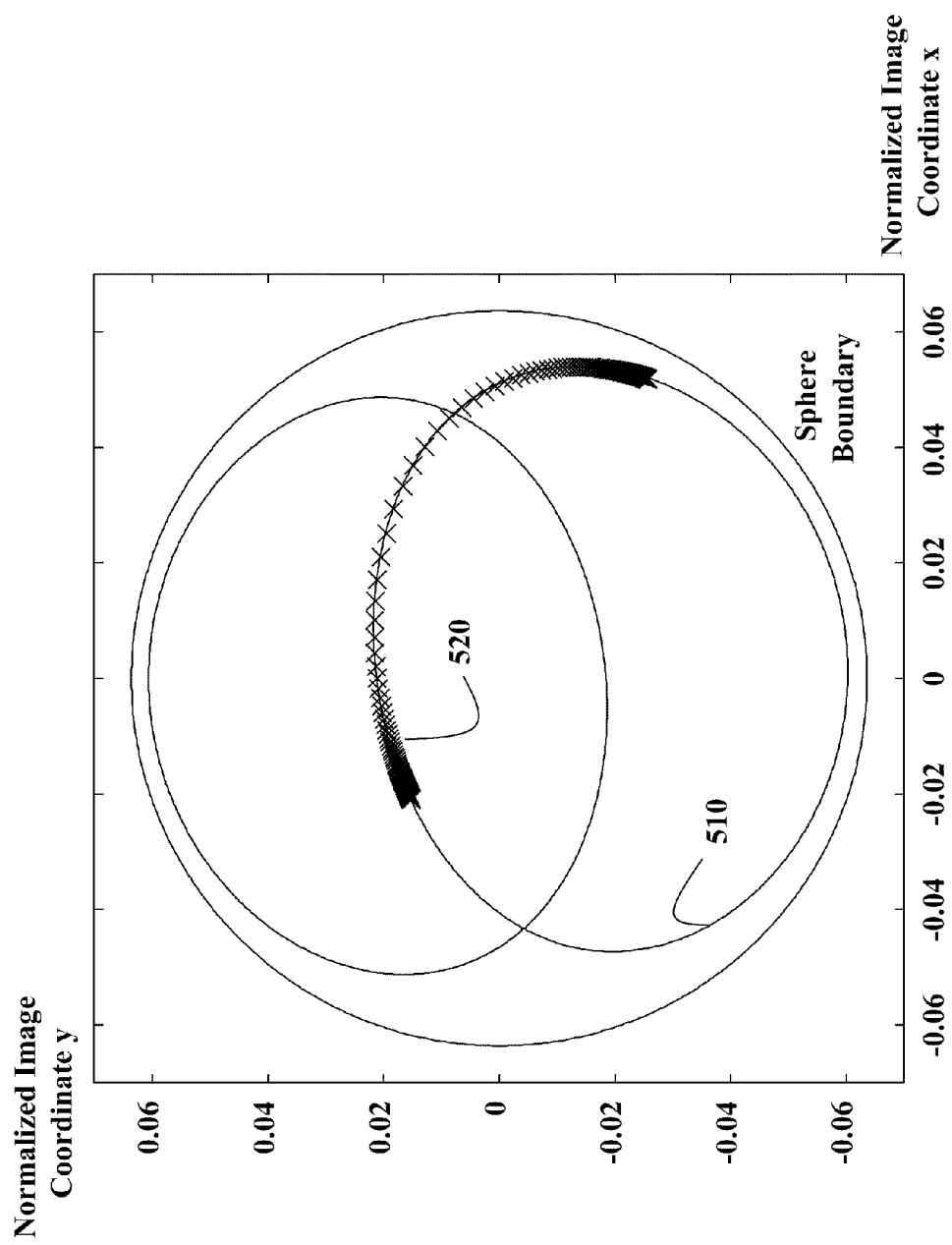
FIG. 5 is a graph of epipolar curves for spherical mirror according to the embodiments of the invention.

FIG. 5 is a graph that compares the epipolar curve 510 analytically determined based on Equation (19) with the curve 520 obtained by projecting 3D points on $L_0$ using the FP equation. The shape of curves is a continuous section of the analytical quartic curve. Also, the image point converges as the 3D point goes to $\pm\infty$ on $L_0$.

Similar to perspective cameras, the quartic epipolar curve can be used to restrict the search space for dense stereo matching. Typically, approximations such as epsilon-stereo constraint are used, which assumes that the corresponding matches are arranged approximately along a line. However, the embodiments provide the analytical 2D epipolar curve for non-central spherical mirror cameras. The FP equation for general conic mirrors simplifies the correspondence search for other non-central conic catadioptric systems as well.

EFFECT OF THE INVENTION

The embodiments of the invention advance the field of catadioptric imaging both theoretically and practically. Embodiments provide analytical equations of forward and backward projections for a broad class of non-central catadioptric systems. Furthermore, the analytical FP and Jacobian computation significantly reduce the bundle adjustment runtime. Thus, the computational complexity of using a non-central model becomes similar to that of a central approximation.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for determining a three-dimensional (3D) location of at least one folding point of a ray between a point in a scene (PS) and a center of projection (COP) of a camera of a catadioptric system, wherein the catadioptric system includes the camera arranged at a distance from a surface of a folding optical element, wherein the folding optical element is selected from a reflector or a refractor, wherein the folding point is on the surface and is caused by a reflection or a refraction of the ray on the surface such that the folding point partitions the ray into an incoming ray and an outgoing ray, and wherein the PS and the COP are identified by 3D locations, comprising steps of:

acquiring a configuration of the catadioptric system, wherein the catadioptric system is non central, the surface is a quadric surface rotationally symmetric around an axis of symmetry of the surface, and wherein the COP is arranged on the axis of symmetry;

mapping the surface, and the 3D locations of the PS and the COP on a two-dimensional (2D) plane defined by the axis of symmetry and the PS to produce a conic and 2D locations of the PS and COP on the 2D plane, wherein the conic is a parameterization of the surface on the 2D plane;

determining a 2D location of the folding point on the 2D plane based on the conic, the 2D locations of the PS and the COP, and at least one constraint on the incoming ray and the outgoing ray; and determining the 3D location of the folding point from the 2D location of the folding point on the 2D plane, wherein the steps of the method are performed by a processor.

2. The method of claim 1, wherein the folding optical element is the refractor, the folding point is a point of refraction of the ray from the surface, and the constraint is a law of refraction.

3. The method of claim 2, wherein the refractor is a refractive sphere, and the axis of symmetry passes through a center of the refractive sphere and the COP.

4. The method of claim 3, wherein at least one folding point includes a first refraction point $n_1 = [x,y]^T$ and a second refraction point $n_2 = [x_2, y_2]^T$, the constraints are $$v_2 = \frac{1}{\mu} v_1 + \frac{-v_1^T n_1 - \sqrt{(v_1^T n_1)^2 - r^2(1-\mu^2)(v_1^T v_1)}}{\mu r^2} n_1 \text{ and}$$

$$v_3 = \mu v_2 + \frac{-v_1^T n_1 - \mu v_2^T n_1}{r^2} n_2,$$

and a coordinate x and a coordinate y of the 2D location of the first refraction point is determined according to a forward projection (FP) equation $$0 = K_2^2(x,y)A + K_3^2(x,y)A^3 + 2K_2(x,y)K_3(x,y)A^2 - K_1^2(x,y),$$

and the coordinate $x_2$ and the coordinate $y_2$ of the second refraction point are determined according to $$n_2 = n_1 - \frac{2v_2^T n_1}{v_2^T v_2} v_2,$$

wherein $v_1$, $v_2$, and $v_3$ are vectors representing light path from the COP to the first refraction point, from the first refraction point to the second refraction point, and from the second refraction point to the PS, respectively, r is the radius of the refractive sphere, $\mu$ is the refractive index of the refractive sphere, $K_1$, $K_2$, and $K_3$ are refractive polynomials in x and y, and wherein $x^2 = r^2 - y^2$.

5. The method of claim 1, further comprising:
determining a 2D image projection of the PS from 3D location of the folding point according to $$(p, q) = \left( f_x \frac{X_f}{Z_f} + c_x, f_y \frac{Y_f}{Z_f} + c_y \right),$$

wherein (p, q) are coordinates of the 2D image projection, $(X_f, Y_f, Z_f)$ are coordinates of the folding point, $(f_x, f_y)$ are effective focal lengths of the camera in x and y directions, and $(c_x, c_y)$ is a 2D principal point of the camera.

6. The method of claim 5, further comprising:
determining concurrently 3D points in the scene and parameters of the catadioptric system using bundle adjustment.

7. The method of claim 5, further comprising:
determining a Jacobian matrix of a reprojection error.

8. The method of claim 7, further comprising:
determining concurrently 3D points in the scene and parameters of the catadioptric system using the Jacobian matrix and bundle adjustment.

9. The method of claim 1, wherein the folding optical element is the reflector, the folding point is a point of reflection of the ray from the surface, and the constraint is a law of reflection.

10. The method of claim 9, wherein the reflector is a spherical mirror, and the axis of symmetry passes through a center of the spherical mirror and the COP.

11. The method of claim 9, wherein the constraint is $$v_r^T n = -v_i^T n,$$

and a second coordinate y of the 2D location of the folding point is determined according to a forward projection (FP) equation $$u^2 K_1^2(y) + K_2^2(y)(Ay^2 + By - C) = 0, \text{ and}$$

a first coordinate x of the 2D location of the folding point is determined based on the second coordinate y according to $$x = \text{sign}(u) \sqrt{C - By - Ay^2},$$

wherein $v_i$ is a vector representing the incoming ray, $v_r$ is a vector representing the outgoing ray, T is a transpose operator, n is a vector representing a normal of the surface at the folding point, u is a first coordinate of the 2D location of the PS, $K_1(y)$ and $K_2(y)$ are reflection polynomials in y, A, B, C are parameters for the conic.

12. The method of claim 11, further comprising:
determining the 3D location of the folding point according to $$xz_1/\|z_1\| + yz_2/\|z_2\|,$$

wherein $z_1$ and $z_2$ are axes determining a coordinate system of the 2D plane.

13. The method of claim 11, wherein the folding optical element is a spherical mirror and the FP equation is $$u^2(r^2(d+y) - 2dy^2)^2 - (r^2 - y^2)(r^2(d+v) - 2dvy)^2 = 0,$$

wherein (u, v) is the 2D location of the PS, y is a second coordinate of the 2D location of the folding point, r is a radius of the spherical mirror, d is a distance between the COP and a center of the sphere.

14. A catadioptric system configured for determining a three-dimensional (3D) location of at least one folding point of a ray between a point in a scene (PS) and a center of projection (COP) of the catadioptric system, wherein the PS and the COP are identified by 3D locations, and the catadioptric system is non central, comprising:
a folding optical element, wherein the folding point is caused by folding of the ray on a surface of the folding optical element, wherein the surface is a quadric surface rotationally symmetric around an axis of symmetry;
a camera arranged at a distance from the surface, wherein the COP of the catadioptric system is a COP of the camera and arranged on the axis of symmetry;
means for mapping the surface, and the 3D locations of the PS and the COP on a two-dimensional (2D) plane defined by the axis of symmetry and the PS to produce a conic and 2D locations of the PS and COP on the 2D plane, wherein the conic is a parameterization of the surface on the 2D plane;
a processor for determining a 2D location of the folding point on the 2D plane based on the conic, the 2D locations of the PS and the COP; and
means for determining the 3D location of the folding point from the 2D location of the folding point on the 2D plane.

15. The catadioptric system of claim 14, wherein the folding optical element is a reflector, the folding point is a point of reflection of the ray from the surface.

16. The catadioptric system of claim 14, wherein the folding optical element is a refractor, the folding point is a point of refraction of ray from the surface.

17. The catadioptric system of claim 14, further comprising:
means for determining a 2D image projection of the PS from 3D location of the folding point according to $$(p, q) = \left( f_x \frac{X_f}{Z_f} + c_x, f_y \frac{Y_f}{Z_f} + c_y \right),$$

wherein (p, q) are coordinates of the 2D image projection, $(X_f, Y_f, Z_f)$ are coordinates of the folding point, $(f_x, f_y)$ are effective focal lengths of the camera in x and y directions, and $(c_x, c_y)$ is a 2D principal point of the camera.

18. The catadioptric system of claim 14, further comprising:
means for determining concurrently 3D points in the scene and parameters of the catadioptric system using bundle adjustment.

19. A method for determining a three-dimensional (3D) location of at least one folding point of a ray between a point in a scene (PS) and a center of projection (COP) of a catadioptric system, wherein the PS and the COP are identified by 3D locations, and the catadioptric system is non central, comprising steps of:
providing a folding optical element, wherein the folding point is caused by folding of the ray on a surface of the folding optical element, wherein the surface is a quadric surface rotationally symmetric around an axis of symmetry;
providing a camera arranged at a distance from the surface, wherein the COP of the catadioptric system is a COP of the camera and arranged on the axis of symmetry;

mapping the surface, and the 3D locations of the PS and the COP on a two-dimensional (2D) plane defined by the axis of symmetry and the PS to produce a conic and 2D locations of the PS and COP on the 2D plane, wherein the conic is a parameterization of the surface on the 2D plane;

determining a 2D location of the folding point on the 2D plane based on the conic, the 2D locations of the PS and the COP; and determining the 3D location of the folding point from the 2D location of the folding point on the 2D plane, wherein the steps of the method are performed by a processor.

20. The method of claim 19, wherein the folding optical element is selected from a reflector and a refractor.

* * * * *